United States Patent [19]

Kauffman

[11] Patent Number: 4,798,222

[45] Date of Patent: Jan. 17, 1989

[54] VALVE ASSEMBLY PARTICULARLY USABLE WITH A COFFEE BREWING BASKET

[76] Inventor: William Kauffman, 63 Robbinsville-Allentown Rd., Robbinsville, N.J. 08691

[21] Appl. No.: 118,070

[22] Filed: Nov. 6, 1987

[51] Int. Cl.$^4$ .............................................. A47J 31/02
[52] U.S. Cl. ...................................... 137/132; 99/279
[58] Field of Search ...................... 137/123, 132, 153; 99/279, 299, 323; 426/433

[56] References Cited

U.S. PATENT DOCUMENTS

| | | |
|---|---|---|
| 3,220,334 | 11/1965 | Martin . |
| 3,320,073 | 5/1967 | Bixby ............................ 99/299 X |
| 3,385,201 | 5/1968 | Martin . |
| 3,443,508 | 5/1969 | Reynolds . |
| 3,523,178 | 8/1970 | Spensley . |
| 3,589,271 | 6/1971 | Tarrant . |
| 3,740,231 | 6/1973 | Drwal . |
| 4,056,050 | 11/1977 | Brown . |
| 4,343,232 | 8/1982 | Corbier . |
| 4,467,707 | 8/1984 | Amiot . |
| 4,527,467 | 7/1985 | Siemensma ......................... 99/279 |
| 4,622,230 | 11/1986 | Stone . |
| 4,667,587 | 5/1987 | Wunder . |

FOREIGN PATENT DOCUMENTS 730867 3/1966 Canada .............................. 426/433

Primary Examiner—Robert G. Nilson
Attorney, Agent, or Firm—Sperry, Zoda & Kane

[57] ABSTRACT

A valve assembly particularly usable with a coffee brewing basket being automatically dripless during the coffee brewing cycle which includes a valve body member having a head section and a main section threadedly engageable through the lower opening in the brewing basket by threaded engagement with a siphon cap thereabove. The siphon cap includes a plurality of slots for admitting brewed coffee therethrough for siphon feeding and a main tube extending downwardly through a main flow aperture defined in the upper portion thereof to facilitate the main avenue of flow of brewed coffee downwardly through the brew basket opening. Engagement between the main valve body member and the siphon cap is achieved by threaded engagement and a truncated section is included for defining a siphon flow path adjacent the threaded engaging sections.

15 Claims, 1 Drawing Sheet

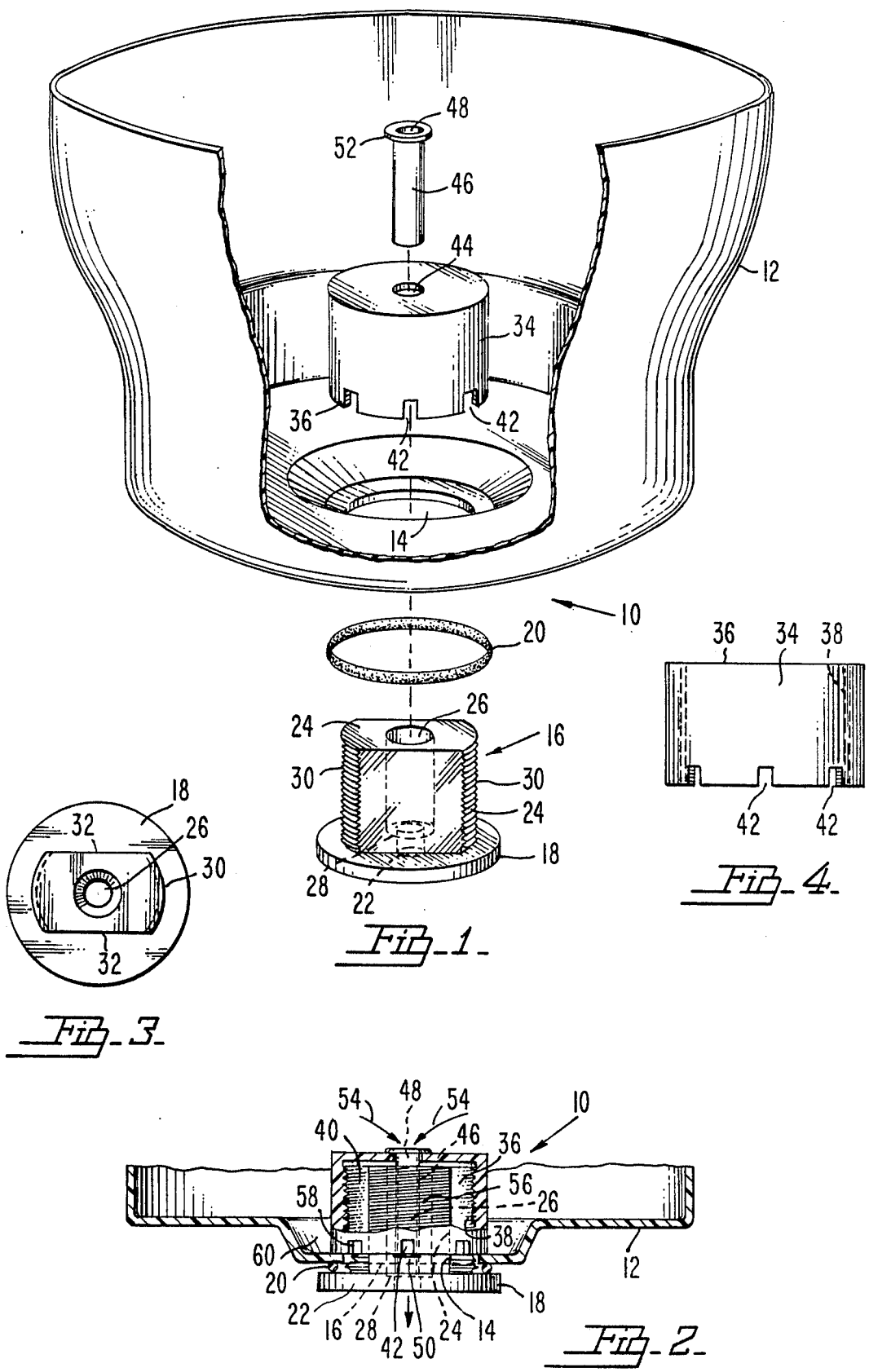

VALVE ASSEMBLY PARTICULARLY USABLE WITH A COFFEE BREWING BASKET

BACKGROUND OF THE INVENTION

1. Field of the Invention

The present invention deals with the field of valving systems positionable adjacent the lower opening of a coffee brew basket within a conventional coffee making machine wherein continuous dripping near the end of the brewing cycle is prevented and the slow dripping of half brewed coffee near the beginning of the brewing cycle is also prevented. Various devices such as sensing means and the like have been used to prevent this dripping. However the present invention provides a means for eliminating such undesired coffee dripping without requiring any specific member to sense whether the coffee pot is in position therebelow.

2. Description of the Prior Art

Prior art devices have been designed for achieving this purpose such as shown in U.S. Pat. No. 3,220,334 patented Nov. 30, 1965 to J. C. Marton on a Coffee Making Machine; U.S. Pat. No. 3,320,073 patented May 16, 1967 to G. Bixby, Jr. et al on a Means For Brewing Coffee; U.S. Pat. No. 3,385,201 patented May 28, 1968 to J. C. Martin on a Cold Water Pour In Beverage Maker; U.S. Pat. No. 3,443,508 patented May 13, 1969 to D. S. Reynolds et al on an Automatic Beverage Brewer; U.S. Pat. No. 3,523,178 patented Aug. 4, 1970 to W. J. Spensley et al on a Method And Apparatus For Heating Liquids; U.S. Pat. No. 3,589,271 patented June 29, 1971 to J. Tarrant et al on a Coffee Making Apparatus; U.S. Pat. No. 3,740,231 patented June 19, 1973 to T. H. Drwal et al on a Coffee Brewer; U.S. Pat. No. 4,056,050 patented Nov. 1, 1977 to R. N. Brown on a Coffeemaker With Brew Strength Control; U.S. Pat. No. 4,343,232 patented Aug. 10, 1982 to W. Corbier on a Coffee Maker; U.S. Pat. No. 4,467,707 patented Aug. 28, 1984 to J. Amiot on a Domestic Coffee Maker; U.S. Pat. No. 4,622,230 patented Nov. 11, 1986 to W. Stone, Jr. on a Displacement Type Coffee Maker; and U.S. Pat. No. 4,667,587 patented May 26, 1987 to D. Wunder on an Electric Coffee Maker With Anti-Drip Valve On Bottom Of Filter.

SUMMARY OF THE INVENTION

The present invention provides an automatic dripless valve assembly usable with a coffee brewing basket having a brewing aperture defined in the lower portion thereof. The valve assembly includes a valve body member positioned immediately below the brewing basket adjacent the brewing aperture.

This valve body includes a head section positioned below the brewing basket adjacent the brewing aperture which is sealed with respect to the underside of the coffee brewing basket adjacent the brew aperture to prevent any flow of coffee therebetween. This head section defines an exit bore extending therethrough to facilitate movement of brewed coffee from the brewing basket to a receiver therebelow under normal circumstances being a coffee pot.

A main section is defined to be integral with respect to the head section and extending upwardly therefrom through the brewing aperture. This main section will define a central flow bore extending longitudinally therethrough and preferably in registration with respect to the exit bore therebelow. This central flow bore is in fluid flow communication with respect to the interior of the brewing basket to receive brewed coffee therefrom. The main section also includes a threaded side section and at least one truncated side section between the threaded side sections.

A siphon cap is adapted to be secured with respect to the threaded side sections of the main section and defines a central chamber therein. Securement with the threaded side sections of the main section are provided by threaded sections of the siphon cap. The central chamber of the siphon cap is positioned adjacent the truncated side section of the main section to define a siphon flow channel therein. The siphon cap further defines a plurality of slot means therein in fluid flow communication with respect to the siphon flow channel and with respect to the brew basket for supplying coffee thereto for siphon flow. The siphon cap further defines a main flow aperture in fluid flow communication with respect to the central flow bore of the main section.

A main flow tube is included positioned extending downwardly through the main flow aperture defined in the siphon cap and through the central flow bore defined in the valve body to further facilitate movement of brewed coffee from the brew basket downwardly. The main flow tube defines a main flow conduit extending therethrough to provide this avenue of flow. Thus the valve assembly of the present invention provides two main paths of flow. Firstly, a siphon flow path is defined by fluid flow communication through the plurality of slots and then through the siphon flow channel and the siphon flow region defined between the outer wall of the main flow tube and the outer wall of the central flow bore and finally through the exit bore. Secondly, a main flow path will be defined by fluid flow communication through the main flow tube, the main flow aperture, the central flow bore and finally through the exit bore. The primary flow will certainly be through the main flow area and certainly the greater amount of coffee will flow through that path. However the siphon flow path will provide the capability for the valve assembly of the present invention to be automatically dripless.

The main section preferably defines two truncated side sections positioned on opposite sides of the main section between oppositely configured threaded side sections. It is also preferable that a gasket means be positioned between the head section 18 and the lower surface of the basket 12 to minimize fluid flow therebetween. The main flow tube may include an upper rim means thereon adapted to abut the top surface of the siphon cap means to aid in retaining of the main flow tube within the main flow aperture and the central flow bore. Alternatively the main flow tube could be integrally formed with respect to the siphon cap as manufacturing conveniences dictate.

It is further preferred that the lowermost edge of the main flow tube is positioned below the lowermost edge of the slot means defined in the siphon cap to facilitate siphon flow through the siphon flow path.

It is an object of the present invention to provide an automatic dripless valve assembly particularly usable with a coffee brewing basket wherein continuous dripping at the end of a coffee brewing cycle is minimized.

It is an object of the present invention to provide an automatic dripless valve assembly particularly usable with a coffee brewing basket wherein release of partially brewed coffee in the initial portion of the brewing cycle is minimized.

It is an object of the present invention to provide an automatic dripless valve assembly particularly usable with a coffee brewing basket wherein the length of time of a coffee brewing cycle is minimized while still maintaining the brewing of a complete pot of coffee.

It is an object of the present invention to provide an automatic dripless valve assembly particularly usable with a coffee brewing basket wherein maintenance costs and down time are minimized.

It is an object of the present invention to provide an automatic dripless valve assembly particularly usable with a coffee brewing basket wherein a minimum number of moving parts are utilized.

It is an object of the present invention to provide an automatic dripless valve assembly particularly usable with a coffee brewing basket wherein a main flow path is provided for maximizing flow of brewed coffee and wherein a siphon flow path is provided for controlling precycle and post-cycle excessive dripping.

It is an object of the present invention to provide an automatic dripless valve assembly particularly usable with a coffee brewing basket wherein costs of manufacture are minimized.

It is an object of the present invention to provide an automatic dripless valve assembly particularly usable with a coffee brewing basket wherein contamination of the valving system through leakage of coffee grounds is minimized.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a front exploded view of an embodiment of the valve assembly of the present invention;

FIG. 2 is a side cross sectional view of an embodiment of the valve assembly of the present invention shown in the installed position;

FIG. 3 is a bottom plan view of an embodiment of the valve body member of the present invention; and FIG. 4 is a side plan view of an embodiment of the siphon cap of the present invention.

DETAILED DESCRIPTION OF THE PREFERRED EMBODIMENT

The present invention provides a valve assembly 10 being particularly usable with a coffee brewing basket 12 which defines in the lower floor thereof a brewing aperture 14. Preferably the coffee brewing basket 12 will also define a lower brewing section 60 therein such that the valve assembly can be operative to act upon a maximum amount of coffee within the coffee brew basket without allowing puddling and the like to remain therein.

Valve assembly 10 includes a valve body member 16 having a head section 18 positioned adjacent the brewing basket 12 immediately below the brewing aperture 14. Head section 18 will be sealed with respect to the bottom surface of the basket 12 to prevent fluid flow communication therewith and may include a gasket means 20 positioned therebetween for this purpose.

Head section 18 defines an exit bore 22 centrally extending therethrough to admit coffee from the brew basket downwardly into a pot or other container which may be positioned therebelow.

A main section 24 is preferably integral with respect to the head section 18 of valve body member 16 and defines a central flow bore 26 extending downwardly therethrough. The central flow bore may be larger in diameter than the exit bore 22 in which case a shoulder 28 would be positioned between a bore 26 and bore 22 as shown best in FIG. 1.

Main section 24 may include one or two threaded side sections 30 which are cylindrically convex. Between the threaded side sections 30 truncated side sections 32 may be positioned.

A siphon cap means 34 is preferably included in the valve assembly 10 and is positioned in the brewing basket 12 immediately above the aperture 14 therein. Siphon cap means 34 may include a central chamber 36 therein having cylindrically concave threaded sections 38 adapted to engage with respect to the threaded side sections 30 of main section 24 to secure siphon cap 34 with respect to main section 24.

A siphon flow channel means 40 will be defined between siphon cap 34 and truncated side sections 32 of main section 24 when the siphon cap 34 is secured with respect to the main section 24. When two such truncated side sections 32 are utilized two individual siphon flow channels 40 will be defined.

Siphon cap 34 will include a slot means 42 defined therein to allow brewed coffee to flow from the brewing basket 12 directly through slot means 42. Preferably slot means 42 will comprise a plurality of individual slots defined in the lowermost edge of the siphon cap 34.

Siphon cap 34 will define a main flow aperture 44 in the upper section therein and will be adapted to receive a main flow tube 46 extending therethrough and downwardly into the central flow bore 26 defined therebelow. This main flow tube 46 may be integrally configured with respect to the siphon cap 34 if found to be a manufacturing convenience.

Main flow tube 46 will define a main flow conduit 48 therethrough having a lowermost edge 50 therebelow. The lowermost edge 50 will preferably be positioned below the lowermost portion of slot means 42 to allow siphon flow from slot means 42 past the lowermost edge 50.

To facilitate retainment of main flow tube 46 within the main flow aperture 44 when the main flow tube 46 is not integral with respect to siphon cap 34, an upper rim means 52 may be included on the upper edge of main flow tube 46.

With this structural configuration a main flow path 54 as well as a siphon flow path 58 will be defined. The siphon flow path includes a cylindrically annular siphon flow region 56 defined between the, outer surface of the main flow tube 46 and the inside diameter of the central flow bore 26. As such siphon flow path 58 will initiate at the slot means 42 with brewed coffee passing therethrough. This brewed coffee will then pass upwardly through the siphon flow channel means 40 upwardly to a position immediately below the upper edge of the siphon cap 34 and then downwardly through the cylindrically annular siphon flow region 56. This brewed coffee will then further pass downwardly past the lowermost edge 50 of main flow tube 46 and through exit bore 22 into a coffee pot therebelow.

The main flow path 54 will be defined by the movement of coffee through the main flow conduit 48 defined in the main flow tube 46 downwardly through the main flow aperture 44 and the central flow bore 28. This brewed coffee will pass further downwardly through the exit bore 22 and at this point will join with the coffee moving through the siphon flow path.

In operation of the automatic dripless valve and brewing basket of the present invention initially coffee will be placed within the brewing basket 12. Thereafter water will start to be admitted therein. As water fills the brew basket 12 coffee will initially enter through slots 42 and as the brew basket continues to fill coffee will gradually move upwardly through the siphon flow channels 40 adjacent the truncated side sections 32. Actual feeding of the coffee through the siphon flow path 58 will not occur until the level of coffee fills to just over the maximum vertical height of the main section 24. At this time coffee will spill over and down the cylindrically annular siphon flow region 56 and past the lowermost edge 50 of main flow tube 46. This coffee will then pass downwardly to a coffee pot by movement through exit bore 22. This initial flow of coffee through the siphon flow path 58 will be relatively slow. However the restriction of having no coffee flow until the level of coffee is higher than the uppermost portion of the main section 24 will prevent dispensing of partially brewed coffee in the initial steps of the brewing cycle.

Certainly the speed of flow of water into the brewing basket 12 will be greater than the capability of the siphon flow path 58 to exit coffee. As such the level of coffee within the brewing basket will continue to increase even after full flow is achieved through the siphon flow path 58.

Once the coffee level reaches the height of the main flow tube 46 or the upper rim means 52 flow of coffee through the main flow conduit 48 will be initiated. The level of coffee will increase as the main flow path 54 now takes over as the main path of coffee flow downwardly to the coffee pot therebelow.

Once the full load of water has been admitted into the coffee brewing basket 12 the level of coffee therein will start to decrease as the siphon flow path 58 and the main flow path 54 continue to move coffee downwardly into the pot therebelow. As the level of coffee decreases near the end of the cycle flow through the main flow path 54 will cease when the level of coffee gets to below the height of the main flow tube 46. The level of coffee will continue to decrease as coffee continues to flow through the siphon flow path 58. However once the coffee level reaches the slightest bit below the upper edge of the slot means 42, coffee flow will instantly cease since the suction of the siphon flow will be broken. Further coffee flow cannot occur unless the level of coffee within the brew basket goes from that current level adjacent the upper edge of slot means 42 back to the level of the main section 24. This amount of coffee production will not occur since there is only minimal dripping of coffee from the grounds and as such there will be no excessive dripping at the end of the cycle.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A valve assembly, particularly usable with a coffee brewing basket having a brewing aperture defined therein, comprising:
   a. a valve body member positioned immediately below the coffee brewing basket and adjacent the brewing aperture, said valve body member including:
      1. a head section positioned below the coffee brewing basket adjacent the brew aperture defined therein, said head section being sealed with respect to the underside of the coffee brewing basket to prevent fluid flow therebetween, said head section defining an exit bore extending therethrough;
      2. a main section integral with respect to said head section and extending upwardly therefrom through the brewing aperture defined in the brewing basket, said main section defining a central flow bore extending longitudinally therethrough and in fluid flow communication with respect to the interior of the brewing basket and with respect to said exit bore defined in said head section, said main section including a threaded side section and at least one truncated side section;
   b. a siphon cap means defining a central chamber therein, said siphon cap means including a threaded section adapted to be secured with respect to said threaded side section of said main section, said central chamber being positioned adjacent said truncated side section of said main section to define a siphon flow channel means, said siphon cap means defining slot means therein in fluid flow communication with respect to said siphon flow channel means and with respect to the interior of the brew basket, said siphon cap means further defining a main flow aperture in fluid flow communication with respect to said central flow bore of said main section; and
   c. a main flow tube defining a main flow conduit extending therethrough, said main flow tube being positioned extending downwardly through said main flow aperture defined in said siphon cap means and through said central flow bore defined in said valve body member to facilitate movement of brewed coffee from the brew basket downwardly through said main flow aperture, said main flow conduit, said central flow bore and said exit bore.

2. A valve assembly particularly usable with a coffee brewing basket as defined in claim 1 wherein said main section defines two of said truncated side sections positioned on opposite sides of said main section.

3. A valve assembly particularly usable with a coffee brewing basket as defined in claim 1 further comprising a gasket means positioned between said head section of said valve body member and the bottom of the brewing basket to prevent fluid flow therebetween.

4. A valve assembly particularly usable with a coffee brewing basket as defined in claim 1 wherein said main flow tube includes an upper rim means thereon adapted to abut the top surface of said siphon cap means to facilitate retaining of said main flow tube within said main flow aperture and said central flow bore.

5. A valve assembly particularly usable with a coffee brewing basket as defined in claim 1 wherein the lowermost edge of said main flow tube is positioned below the lowermost edge of said slot means defined in said siphon cap means.

6. A valve assembly particularly usable with a coffee brewing basket as defined in claim 1 wherein said threaded section of said siphon cap means is concave.

7. A valve assembly particularly usable with a coffee brewing basket as defined in claim 6 wherein said threaded section of said siphon cap means is cylindrically concave.

8. A valve assembly particularly usable with a coffee brewing basket as defined in claim 1 wherein said threaded side section of said main section of said valve body member is convex.

9. A valve assembly particularly usable with a coffee brewing basket as defined in claim 8 wherein said threaded side section of said main section of said valve body member is cylindrically convex.

10. A valve assembly particularly usable with a coffee brewing basket as defined in claim 1 further comprising a shoulder means defined within the fluid flow path defined within said central flow bore and said exit bore.

11. A valve assembly particularly usable with a coffee brewing basket as defined in claim 1 further including a main flow path defined by fluid flow communication through said main flow tube, said main flow aperture, said central flow bore and said exit bore.

12. A valve assembly particularly usable with a coffee brewing basket as defined in claim 1 further including a siphon flow region defined between the outer wall of said main flow tube and the outer wall of said central flow bore.

13. A valve assembly particularly usable with a coffee brewing basket as defined in claim 12 wherein said siphon flow region is cylindrically annular.

14. A valve assembly particularly usable with a coffee brewing basket as defined in claim 12 further including a siphon flow path defined by fluid flow communication through said slot means, said siphon flow channel means, said siphon flow region and said exit bore.

15. A valve assembly, particularly usable with a coffee brewing basket having a brewing aperture defined therein, comprising:
  a. a valve body member positioned immediately below the coffee brewing basket and adjacent the brewing aperture, said valve body member including:
    1. a head section positioned below the coffee brewing basket adjacent the brew aperture defined therein, said head section being sealed with respect to the underside of the coffee brewing basket to prevent fluid flow therebetween, said head section defining an exit bore extending therethrough, said head section providing an annular shoulder means positioned in the upper end of said exit bore;
    2. a main section integral with respect to said head section and extending upwardly therefrom through the brewing aperture defined in the brewing basket, said main section defining a central flow bore extending longitudinally therethrough and in fluid flow communication with respect to the interior of the brewing basket and with respect to said exit bore defined in said head section, said main section including two threaded side sections being cylindrically convex and two truncated side sections;
  b. a siphon cap means defining a central chamber therein, said siphon cap means including a threaded section being cylindrically concave and mated to said cylindrically convex threaded side sections, said threaded section of said siphon cap means being adapted to be secured with respect to said threaded side section of said main section, said central chamber being positioned adjacent said truncated side section of said main section to define a siphon flow channel means, said siphon cap means defining slot means therein in fluid flow communication with respect to said siphon flow channel means and with respect to the interior of the brew basket, said siphon cap means further defining a main flow aperture in fluid flow communication with respect to said central flow bore of said main section;
  c. a main flow tube defining a main flow conduit extending therethrough, said main flow tube being positioned extending downwardly through said main flow aperture defined in said siphon cap means and through said central flow bore defined in said valve body member to facilitate movement of brewed coffee from the brew basket downwardly through said main flow aperture, said main flow conduit, said central flow bore and said exit bore, said main flow tube defining a cylindrically annular siphon flow region between the outer surface thereof and the outer wall of said central flow bore, said main flow tube including an upper rim means at the upper end thereof adapted to abut the top surface of said siphon cap means to facilitate retaining of said main flow tube within said main flow aperture and said central flow bore, the lowermost edge of said main flow tube being positioned below the lowermost edge of said slot means defined in said siphon cap means, said main flow tube cooperating with said main flow aperture, said central flow bore and said exit bore to define a main flow path for brewed coffee to exit the brew basket, said siphon flow region cooperating with said slot means, said siphon flow channel means and said exit bore to define a siphon flow path for brewed coffee to exit the brew basket; and
  d. a gasket means positioned between said head section of said valve body member and the bottom of the brewing basket to prevent fluid flow therebetween.

* * * * *